(12) United States Patent
Koike

(10) Patent No.: US 8,754,994 B2
(45) Date of Patent: Jun. 17, 2014

(54) PATTERNED POLARIZATION PLATE, IMAGE DISPLAY APPARATUS AND IMAGE DISPLAY SYSTEM

(75) Inventor: Yoshio Koike, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 146 days.

(21) Appl. No.: 13/456,865

(22) Filed: Apr. 26, 2012

(65) Prior Publication Data

US 2012/0287379 A1 Nov. 15, 2012

(30) Foreign Application Priority Data

May 13, 2011 (JP) ................. 2011-108100

(51) Int. Cl.
*G02F 1/1333* (2006.01)
(52) U.S. Cl.
USPC .......................................................... 349/15
(58) Field of Classification Search
CPC .................................................. G02B 27/2214
USPC .......................................................... 349/15
See application file for complete search history.

(56) References Cited

U.S. PATENT DOCUMENTS

| | | | |
|---|---|---|---|
| 5,327,285 A | | 7/1994 | Faris |
| 6,046,787 A | * | 4/2000 | Nishiguchi ............. 349/129 |
| 7,404,642 B2 | * | 7/2008 | Shestak et al. ............. 353/7 |

FOREIGN PATENT DOCUMENTS

| | | |
|---|---|---|
| JP | H10-232365 A | 9/1998 |
| JP | 2001-59949 A | 3/2001 |
| JP | 2005-215326 A | 8/2005 |
| JP | 2005-29215 A | 10/2005 |
| JP | 2010-096900 A | 4/2010 |
| JP | 4508280 B | 7/2010 |

OTHER PUBLICATIONS

Notice of Reasons for Rejection issued by the JPO on Dec. 24, 2013 in connection with the corresponding Japanese Patent Application No. 2011-108100.

* cited by examiner

*Primary Examiner* — James Dudek
(74) *Attorney, Agent, or Firm* — Jean C. Edwards, Esq.; Edwards Neils PLLC

(57) ABSTRACT

The invention provides a patterned polarization plate that contributes to reduction of crosstalk. The invention is a patterned polarization plate disposed on an observation-side surface of a display panel, having at least a patterned phase difference layer in which at least one of slow axes and retardation are mutually different and stripe-shaped first and second phase difference patterns are mutually disposed, a patterned phase difference film having a film that supports the patterned phase difference layer, and a polarization film, in which a pattern cycle direction in the patterned phase difference layer and absorption axes in the polarization film are in parallel with each other, and the polarization film is a patterned polarization plate having the absorption axes disposed in parallel with the up and down directions of a display surface of the display panel.

7 Claims, 8 Drawing Sheets

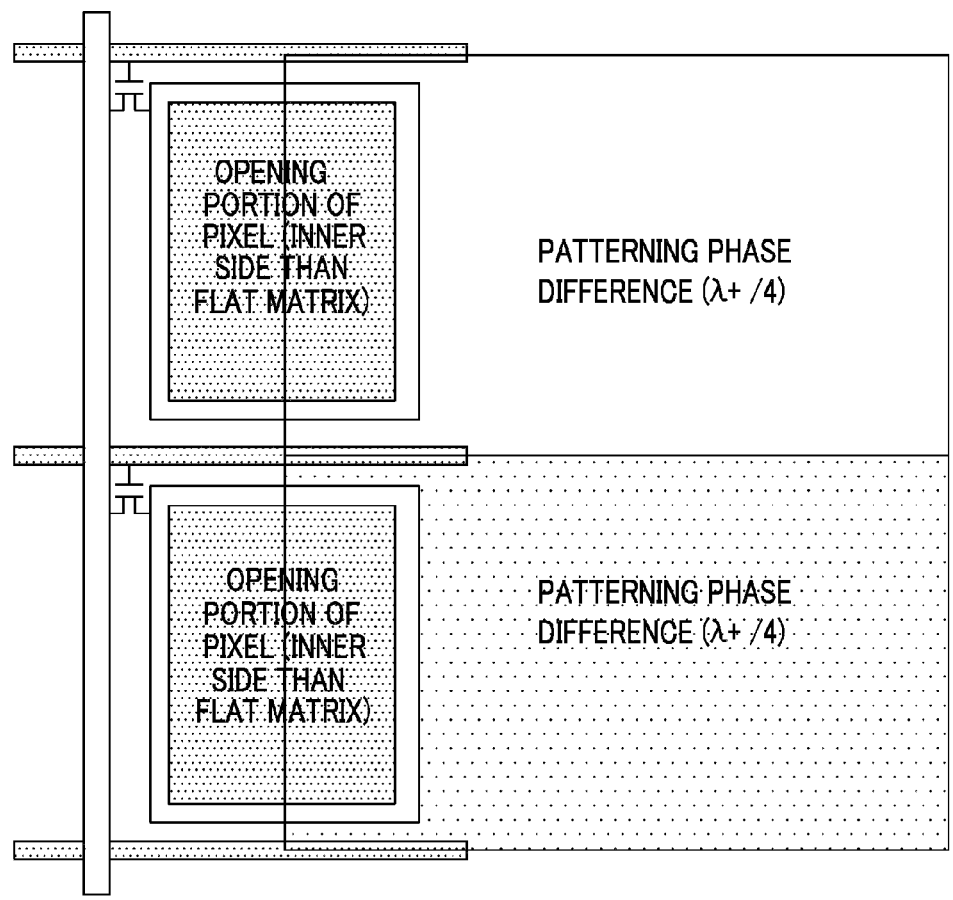

# PATTERNED POLARIZATION PLATE, IMAGE DISPLAY APPARATUS AND IMAGE DISPLAY SYSTEM

CROSS-REFERENCE TO RELATED APPLICATIONS

This application claims priority from Japanese Patent Application No. 2011-108100, filed May 13, 2011, the contents of which are hereby incorporated by reference in their entirety.

BACKGROUND OF THE INVENTION

1. Field of the Invention

The present invention relates to a patterned polarization plate that is used for three-dimensional (3D) image display, an image display apparatus, and an image display system having the same.

2. Description of the Related Art

Currently, there is a polarized glass method (passive glasses) as a 3D display method. This method has a large merit of causing no deterioration of image qualities during two-dimensional (2D) display, and can be termed a powerful method since 2D and 3D can be switched in a case in which there is an insufficient amount of 3D content. In the passive glass method, light emitted from a display panel is made to have two different kinds of polarization states (for example, right polarization/right-handed circularly polarized light and left polarization/left-handed circularly polarized light), and polarization glasses that are configured to have a polarization plate that transmits only one polarization and another polarization plate that transmits only the other polarization are used to observe a display screen, whereby images are stereoscopically recognized.

In the passive glasses method, a patterned phase difference plate is used in order to turn emitted light into two different kinds of polarization states. Generally, the patterned phase difference plate is composed of a patterned phase difference layer in which slow axes and/or phase difference areas having different phase differences are regularly disposed, and a supporter that supports the patterned phase difference layer (for example, JP2001-59949 and U.S. Pat. No. 5,327,285). In the past, a glass substrate was used as the supporter, but a patterned phase difference film (FPR) for which a film is used as the supporter is gaining attention from the viewpoint of handling properties, a decrease in the thickness, a decrease in the weight, and the like (for example, JP4508280B).

Meanwhile, one of the most important items in evaluating the qualities of 3D images is crosstalk. Crosstalk in a 3D image can be indicated by the degree of how well predetermined light for 3D display is made incident to the right eye and the left eye respectively in a desirable form, that is, the proportion of the amount of display information light for the right eye which is incident to the left eye and the proportion of the amount of display information light for the left eye which is incident to the right eye, and, naturally, the image qualities of 3D display improve as crosstalk decreases. There is a concern that crosstalk may significantly intensify in a case in which the FPR is used in the passive glasses method. One of the causes for the above is the dimensional change of the FPR. In a case in which the supporter of the patterning phase difference layer is a glass substrate, the dimensional change due to the temperature and humidity of the environment becomes small, and, once a pattern on the patterned phase difference layer and pixels on the display panel are precisely aligned, then, position deviation does not easily occur. On the other hand, with the FPR, since the dimensions of the film of the supporter significantly change due to the temperature and humidity of the environment, position deviation between a pattern on the patterned phase difference layer and pixels occurs due to environmental conditions and the dimensional change of the supporter film even after the pattern and the pixels are aligned. Particularly, in a liquid crystal display panel, the dimensions of a glass substrate included in a liquid crystal cell seldom change, and thus position deviation due to the dimensional change of the supporter film of the FPR becomes significant.

As a method for solving the above problems, increasing the width of a black matrix in a pixel portion of the FPR or the display panel, or the like can be considered.

SUMMARY OF THE INVENTION

However, in the method, such as increasing the width of the black matrix in the pixel portion of the FPR or the display panel, there is a problem in that the brightness is degraded.

An object of the invention is to provide a patterned polarization plate in which the dimensional change that is dependent on the temperature and humidity of the environment does not easily occur, and which contributes to reduction of crosstalk due to position deviation.

In addition, another object of the invention is to provide an image display apparatus and an image display system in which occurrence of crosstalk that is dependent on the temperature and humidity of the environment is reduced and which are excellent in terms of a 3D display performance.

Measures for solving the above problem are as follows:

[1] A patterned polarization plate disposed on an observation-side surface of a display panel, having at least a patterned phase difference layer in which at least one of slow axis and retardation are mutually different and stripe-shaped first and second phase difference patterns are mutually disposed, a patterned phase difference film having a film that supports the patterned phase difference layer, and a polarization film, in which a pattern cycle direction in the patterned phase difference layer and absorption axes in the polarization film are in parallel with each other.

[2] The patterned polarization plate according to the above [1], having a surface layer on a surface of the patterned phase difference film and on the opposite side to the surface on which the patterned phase difference layer is disposed.

[3] The patterned polarization plate according to the above [1] or [2], in which the surface layer exhibits an anisotropic scattering function with respect to light incident from a polarization film side, and light emitted from the surface layer has an anisotropic scattering function that exhibits stronger scattering characteristics in the pattern cycle direction in the patterned phase difference layer than in an orthogonal direction to the pattern cycle direction.

[4] The patterned polarization plate according to any one of [1] to [3], in which the patterned phase difference layer is a patterned λ/4 layer in which first and second patterns in which the retardation is λ/4 at a wavelength λ nm in a visible light range, and the slow axes are respectively in ±45° directions with respect to the orthogonal direction of the pattern cycle direction are mutually disposed.

[5] An image display apparatus having at least a display panel and the patterned polarization plate according to any one of [1] to [4] on an observation-side of the display panel, in which the polarization film in the patterned polarization plate has absorption axes in the polarization film disposed in parallel with the up and down directions of a display surface of the display panel.

[6] The image display apparatus according to [5], wherein the display panel is a liquid crystal panel.

[7] An image display system having the image display apparatus according to [5] or [6], and a polarization plate disposed between the image display apparatus and an observer which can be removed, in which images are observed by the observer through the polarization plate.

[8] The image display system according to [7], in which 2D images are observed by the observer in a state in which the polarization plate is removed.

According to the invention, it is possible to provide a patterned polarization plate in which dimensional change that is dependent on the temperature and humidity of the environment does not easily occur and which contributes to reduction of crosstalk due to position deviation.

In addition, according to the invention, it is possible to provide an image display apparatus and an image display system in which occurrence of crosstalk that is dependent on the temperature and humidity of the environment is reduced and which are excellent in terms of a 3D display performance.

BRIEF DESCRIPTION OF THE DRAWINGS

FIGS. 9A and 9B are pattern diagrams used to explain position deviation between a pattern and pixels on a patterned phase difference layer.

DESCRIPTION OF THE PREFERRED EMBODIMENTS

Hereinafter, the invention will be described in detail. Meanwhile, in the present specification, the numerical ranges expressed using "to" refer to ranges that include numeric values specified before and after the "to" as the lower limit value and the upper limit value.

Meanwhile, in the specification, "visible light" refers to light having a wavelength of 380 nm to 780 nm. In addition, in the specification, the measurement wavelength will be 550 nm unless particularly otherwise described.

In addition, in the specification, angles (for example, angles of "90°" and the like) and relationships thereof (for example, "orthogonal," "parallel," "crossing at 45°," and the like) are considered to include ranges of errors that are permitted in technical fields to which the invention belongs, which means that angles are, for example, within ranges of strict angles less than ±10°, and the errors are preferably ±5° or less, and more preferably ±3° or less.

The invention relates to a patterned polarization plate disposed on the observation-side surface of a display panel. The patterned polarization plate of the invention has at least a patterned phase difference layer in which at least one of slow axes and retardation are mutually different and stripe-shaped first and second phase difference patterns are mutually disposed, a patterned phase difference film having a film that supports the patterned phase difference layer, and a polarization film, in which a pattern cycle direction in the patterned phase difference layer and absorption axes in the polarization film are in parallel with each other.

Figure 9B:
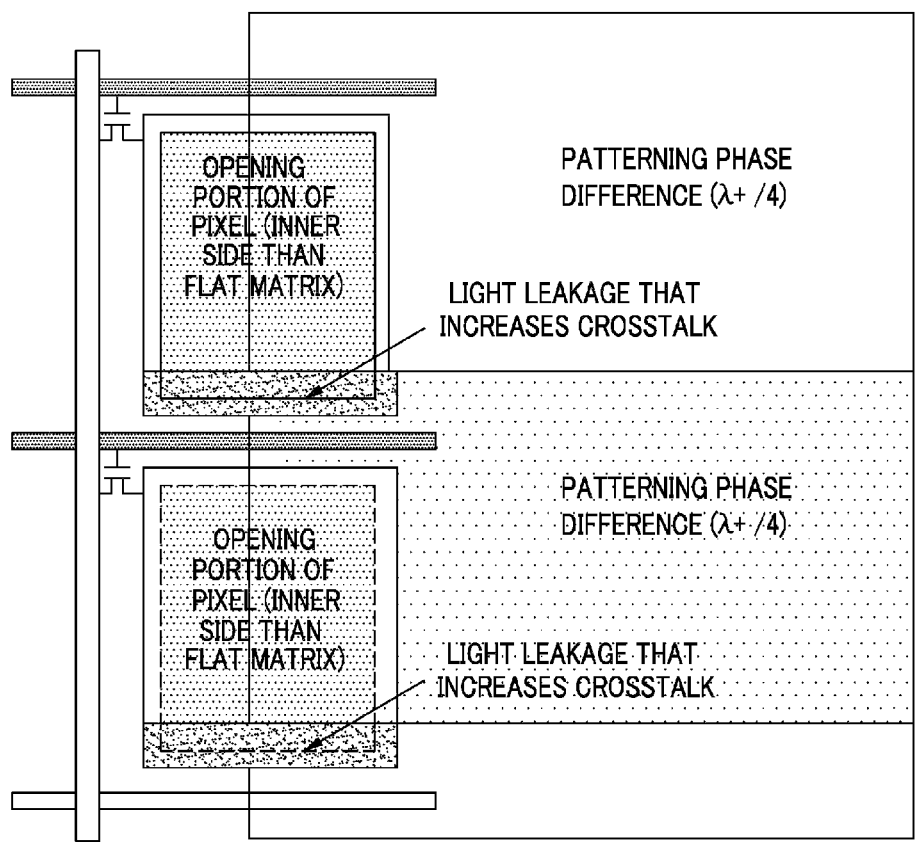

The patterned polarization plate of the invention has a characteristic of including a patterned phase difference film in which a film is used as a supporter, a so-called FPR. The FPR in which a flexible film is used as the supporter has a variety of advantages, such as use of a rigid glass plate so as to be excellent in terms of handling properties; however, on the other hand, there is a problem in that the dimensions are easily changed depending on the temperature and humidity of the environment compared to a glass plate. The dimensional change becomes a fact that causes position deviation with pixels so as to result in crosstalk. FIG. 9A shows a top pattern diagram of a horizontal stripe-shaped patterning phase difference layer (FIG. 9A shows an example of a patterned phase difference layer in which horizontal stripe-shaped ±λ/4 layers are alternately disposed) in a state in which the pattern is aligned with pixels. Theoretically, the patterning phase difference layer is precisely aligned with driving pixels in a display panel having a switching function. However, when the dimensions of the patterning phase difference film change due to poor alignment, heat, and humidity, and locations of the respective patterns change, position deviation with display pixels is caused as shown in FIG. 9B. In a case in which the supporter in the patterning phase difference layer is a glass plate, there is no case of significant dimensional change. In contrast to this, in case of the FPR in which the supporter in the patterned phase difference layer is a film, even when the initial alignment is precisely carried out, and the pattern is precisely joined and disposed with respect to the display pixels, the FPR slightly expands and shrinks due to the characteristics of the polarization film and the FPR under high and low temperatures and high and low humidity, and therefore position deviation as shown in FIG. 9B is caused. In this case, for example, a function of inputting only the right-eye information to the right eye is degraded, and the right-eye information is inputted to the left eye from areas of position deviation. When such a case occurs, so-called 3D crosstalk becomes significant, and 3D image qualities deteriorate. The same description can be made with regard to the left eye.

In the invention, the above problem is solved by integrating the pattern cycle direction in the FPR and the absorption axes in the polarization film in parallel.

As a result of a variety of studies by the inventors regarding the above problem of the FPR of the related art, that is, when the FPR is used, the dimensions change due to the temperature and humidity of the environment even after highly precise alignment is performed once with respect to pixels, it was found that one of the causes is that the FPR follows the expansion and shrinkage of the polarization film. Generally, for a variety of films, there are a MD direction (film transportation direction) and a TD direction (a direction orthogonal to the transportation direction) present in the manufacturing process, and the mechanical characteristics and the like are different. As a result of a variety of studies regarding polarization films that were used in a liquid crystal panel and the like in the related art, the degree of expansion and shrinkage was determined to be superior in the MD direction compared with in the TD direction (the degree of expansion and shrinkage is smaller than in the TD direction). On the other hand, the FPR is generally configured to have stripe-shaped patterns having mutually different slow axes and the like disposed alternately and regularly, and dimensional change due to expansion and shrinkage of the stripe-shaped patterns in the cycle direction in association with the polarization film forms a cause of occurrence of crosstalk, but expansion and shrinkage in the longitudinal direction of the stripe-shaped pattern, which is orthogonal to the cycle direction, does not results in occurrence of crosstalk. In the invention, the pattern cycle direction in the FPR is integrated in parallel with the absorption axes in the polarization film so that the dimensional change of the FPR in the pattern cycle direction, that is, dimensional change which causes occurrence of crosstalk, is reduced. Even when the dimensions of the patterned phase difference film of the invention change due to the temperature and humidity of the environment, the dimensional change is mainly in the longitudinal direction of the stripe-shaped patterns, and dimensional change in the pattern cycle direction, which is a cause of crosstalk, is suppressed. Therefore, it is possible to significantly reduce crosstalk caused by the dimensional change of the patterned phase difference film which is dependent on the temperature and humidity of the environment.

Furthermore, the invention has another characteristic of having absorption axes in the polarization film in the patterned polarization plate disposed on the observation-side surface of the display panel disposed in parallel with the top and bottom direction of the display surface. In the image display apparatus, display characteristics in the right and left direction of the display surface are more important. Generally, since the view angle becomes narrow in the pattern cycle direction in the FPR, it is usual to dispose the longitudinal direction of the stripe-shaped patterns that are orthogonal to the cycle direction in the right and left direction of the display surface. Therefore, in the invention, the absorption axes in the polarization film are disposed in parallel with the up and down directions of the display surface. However, a display having the polarization film disposed on the observation-side surface, such as a liquid crystal display apparatus of the related art, was generally designed and made into a product so that the absorption axes in the polarization film on the observer side, that is, the observation side were in the horizontal direction (right and left). This results mainly from a consideration with which images are prevented from becoming dark even when the observer wears sun glasses and observes the images. However, in a case in which 3D image display is observed, the observer needs to wear polarization glasses, and it is difficult to assume this for the observer wearing sun glasses (emitted light that has passed through the patterned polarization plate becomes circularly polarized light such that the observer cannot recognize 3D images with sun-glasses worn). As a result, in the invention, disposition of the polarization film in the related art is changed, the absorption axes in the polarization film are changed from the horizontal direction to the vertical direction, and, furthermore, the patterning phase difference layer is disposed based on the above relationship. With such a configuration, the dimensional stability of the FPR in the up and down directions of the display surface with respect to the temperature and humidity of the environment, which is important in terms of position deviation with display pixels, is improved, and, consequently, it is possible to improve display quality and reliability as a 3D display apparatus.

The patterned polarization plate of the invention is disposed on the observation-side surface of the display panel, and used for 3D image display, but the display panel with which the patterned polarization plate is combined is not particularly limited. Since the liquid crystal panel originally has the polarization film on the observation-side surface, the liquid crystal panel is appropriate to be used in the invention. In addition, since the liquid crystal panel is slow in terms of the response rate and appropriate for the passive glasses method in which the patterned polarization plate is used compared with a plasma display panel, the liquid crystal panel is appropriate as a display panel that combines with the patterned polarization plate of the invention. However, the display panel is not limited to the liquid crystal panel, and the display panel can be used in a variety of methods, such as an organic EL display panel and a plasma display panel and the like.

Meanwhile, in the liquid crystal panel in a transparent mode, a pair of polarization films are disposed so that the respective absorption axes are orthogonal to each other, but there are an IPS mode, a VA mode, and the like in which the absorption axes on the rear side (back light side) and the absorption axes on the observation side are disposed in the up and down directions of the display surface and in the right and left direction respectively so as to be disposed orthogonally to each other, and a TN mode and the like in which one of the absorption axes is disposed in the 45° direction and the other is disposed in the 135° direction with respect to the right and left direction of the display surface so as to be disposed orthogonally to each other. With regard to the liquid crystal panel in the former mode, it is necessary to replace the absorption axes in the front and rear polarization films with respect to the polarization film disposition of the related art. With regard to the liquid crystal panel in the latter mode, it is necessary to dispose the absorption axes rotated by 45°. Meanwhile, even when the absorption axes are disposed rotated by 45°, there is no particular need of change in the liquid crystal orientation direction of a liquid crystal panel in the TN mode, and the absorption axes may be disposed as in the related art. This is because, as termed the TN mode and a waveguide mode, there is an effect of rotating the orientation of linearly polarized light incident at an arbitrary orientation angle by 90° and emitting the light (refer to JP1995-49493A (JP-H7-49493A)).

Next, a variety of aspects of the invention will be described using the accompanying drawings. Meanwhile, in all of the drawings, the relative relationship of the thickness between the respective layers does not reflect the actual relationship.

Figure 1:
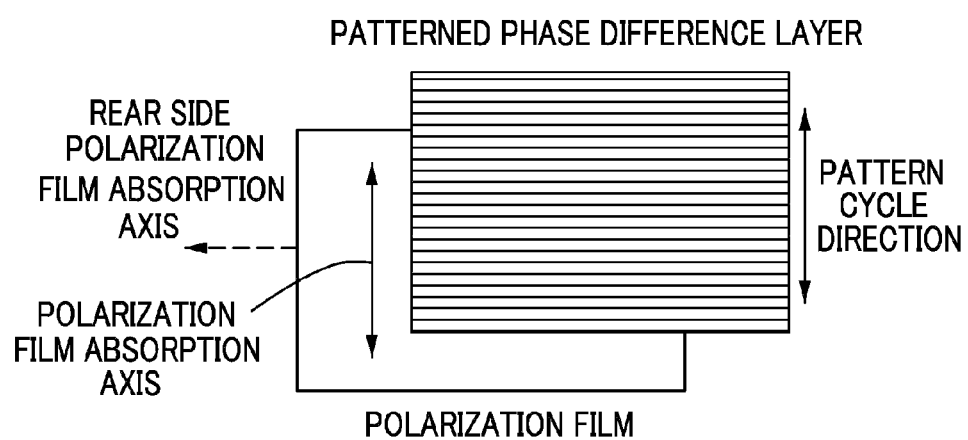
FIG. 1 is a pattern diagram used to explain an example of a patterned polarization plate of the invention.

Firstly, FIG. 1 shows a pattern diagram for explaining the relationship between the absorption axes in the patterned polarization plate of the invention and the cycle direction of the patterned phase difference layer. As shown in FIG. 1, in the invention, the polarization film and the patterned phase difference film are laminated so that the absorption axes in the polarization film and the cycle direction of the stripe-shaped pattern in the patterned phase difference film are in parallel with each other. With the above configuration, the dimensional change of the patterned phase difference film in the pattern cycle direction which is dependent on the temperature and humidity of the environment, which is a cause of occurrence of crosstalk, can be reduced. Furthermore, the view angle characteristics in the right and left directions of the display surface which are important as the view angle characteristics, can be improved by disposing the absorption axes in the polarization film in parallel with the up and down directions of the display surface when disposed on the observation-side surface of the display panel. Meanwhile, in a case in which a liquid crystal panel is used as the display panel, the polarization film is also disposed on the rear side (back light side), but the absorption axes in the polarization film on the rear side are disposed in parallel with the right and left direction of the display surface as shown in FIG. 1.

Figure 2:
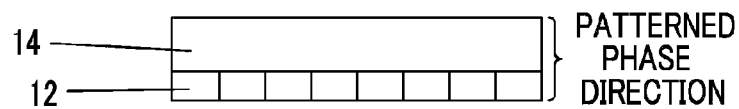
FIG. 2 is a cross-sectional pattern diagram of an example of a patterned phase difference film that can be used in the invention.

FIG. 2 shows a cross-sectional pattern view of an example of a patterned phase difference film that can be used in the invention. The patterned phase difference film as shown in FIG. 2 is a so-called FPR, and has a patterned phase difference layer 12 and a supporter film 14 composed of a polymer film that supports the patterned phase difference layer. An example of the patterned phase difference layer 12 is a $\lambda/4$ layer in which the retardation Re in first and second phase difference areas is $\lambda/4$ at a wavelength $\lambda$ in the visible light range (for example, 550 nm), and a patterned $\lambda/4$ layer in which the slow axes in the respective areas cross each other orthogonally. For example, as shown in FIG. 2, the patterned phase difference layer is a patterned $\lambda/4$ layer in which the retardation in the first and second phase difference areas 12a and 12b is respectively $\lambda/4$, and which has slow axes a and b that cross each other orthogonally respectively. When a patterned phase difference layer of the above aspect is combined with the polarization film, light that has passed through the first and second phase difference areas respectively is in a circularly polarized state in which the light is mutually at the reverse directions, and circularly polarized images for the right eye and the left eye are formed respectively.

The patterned phase difference layer is not limited to the above aspect. It is possible to use a patterned phase difference layer in which the retardation of one of the first and second phase difference areas is $\lambda/4$, and the retardation of the other is $3\lambda/4$. Furthermore, it is also possible to use a patterned phase difference layer in which the retardation of one of the first and second phase difference areas 1a and 1b is $\lambda/2$, and the retardation of the other is 0.

The patterned phase difference layer may have a single layer structure or a lamellar structure of two or more layers. The patterned phase difference layer can be formed of, for example, one or two kinds of compositions containing a liquid crystalline compound having a polymerizable group as a main component.

In addition, the slow axes in the respective patterns in the patterned phase difference layer can be adjusted to be in mutually different directions, for example, mutually orthogonal directions by using a patterned orientation film or the like. As the patterned orientation film, any of a light-oriented film that can form a patterning oriented film through mask exposure and a rubbing-oriented film that can form a patterning oriented film through rubbing can also be used. In addition, it is also possible to use orientation-controlling techniques by nanoimprint without using a patterned oriented film.

Figure 4:
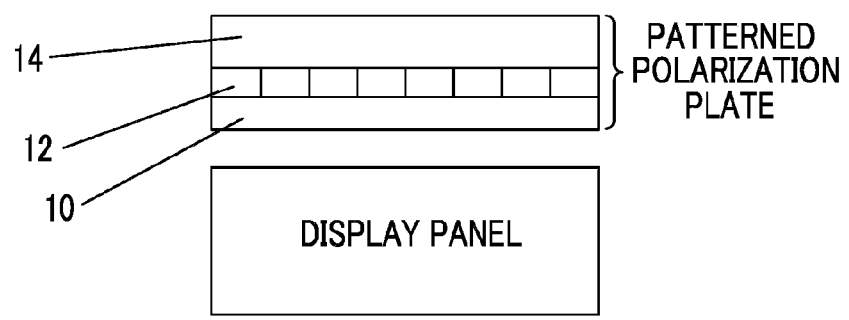
FIG. 4 is a cross-sectional pattern diagram showing an example of the patterned polarization plate of the invention together with a display panel.
Figure 5:
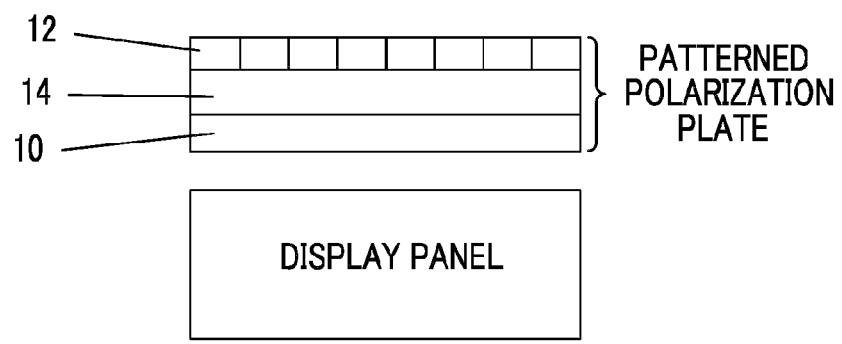
FIG. 5 is a cross-sectional pattern diagram showing an example of the patterned polarization plate of the invention together with the display panel.

FIGS. 4 and 5 respectively show cross-sectional pattern views of examples of the patterned polarization plate of the invention in which the patterned phase difference film as shown in FIG. 2 is integrated with the polarization film together with the display panel.

When the patterned phase difference film is integrated with the polarization film, the surface of the patterned phase difference layer 12 may be joined to the surface of the polarization film 10, or the rear surface of the supporter film 14 (surface on which the patterned phase difference layer 12 is not formed) may also be joined to the surface of the polarization film 10. In addition, the polarization film may also separately have a protective film on the surface, and, even in this case, may have the protective film joined to any of the surfaces. However, it is preferable that a phase difference layer showing high retardation be not present between the polarization film and the patterned phase difference layer, and, in the example of FIG. 5, a polymer film having low retardation is preferably used as the supporter film 14. In addition, even in a case in which the polarization film separately has a protective film, a polymer film having low retardation is preferably used as the protective film. Furthermore, a material that forms an isotropic adhesive layer is preferably used as an adhesive that is used for joining.

Figure 6:
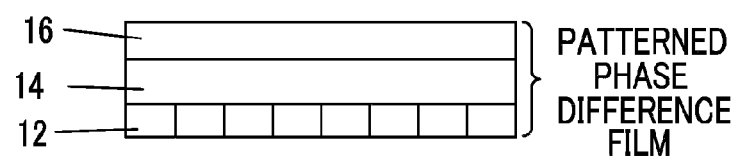
FIG. 6 is a cross-sectional pattern diagram of an example of the patterned phase difference film that can be used in the invention.
Figure 7:
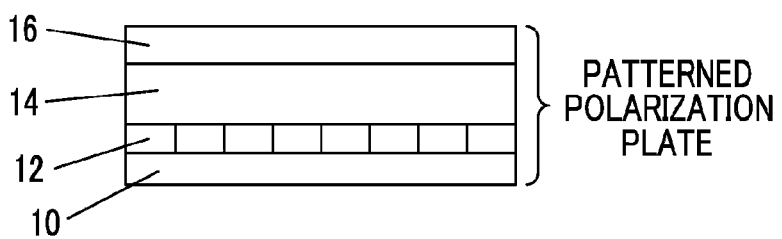
FIG. 7 is a cross-sectional pattern diagram of an example of the patterned polarization plate of the invention.

FIG. 6 shows a cross-sectional pattern diagram of another example of the phase difference film that can be used in the invention, and FIG. 7 shows a cross-sectional pattern diagram of an example of the patterned polarization plate of the invention in which the above phase difference film is used.

The patterned polarization film as shown in FIG. 6 has the patterned phase difference layer 12 on one surface of the supporter film 14, and the surface layer 16 on the other surface. When the patterned phase difference film is integrated with the polymerization film 10, the surface of the patterned phase difference layer 12 is joined to the surface of the polarization film 10 (the surface of a protective film in a case in which the polarization film 10 has the protective film) as shown in FIG. 7, and the surface layer 16 is disposed on the surface on the observation side. The material and functions of the surface layer 16 are not particularly limited. Since the surface layer is disposed outside of the display panel on the observation side, the surface layer 16 is preferably a hard coating layer having a function of protecting the surface layer from physical impacts from the outside or an anti-reflection layer having a function of inhibiting reflection of external light. In addition, the surface layer may be a laminate of a hard coating layer and an anti-reflection layer.

In addition, the surface layer 16 is preferably a layer having a light scattering function. Particularly, when the surface layer is an anisotropic scattering layer in which a scattered light profile in which scattering distribution in the pattern cycle direction in the patterned phase difference layer 12 becomes wide compared to the orthogonal direction can be formed, the pattern cycle direction is the up and down directions of the display surface, and therefore it is possible to alleviate narrowing of the view angle in the up and down directions. Specifically, the surface layer is preferably an anisotropic scattering layer in which an anisotropic scattering function is exhibited with respect to light incident from the polarization film 10 side, and light emitted from the surface layer 16 is more distributed in the pattern cycle direction in the patterned phase difference layer 12 compared to the orthogonal direction.

Figure 8:
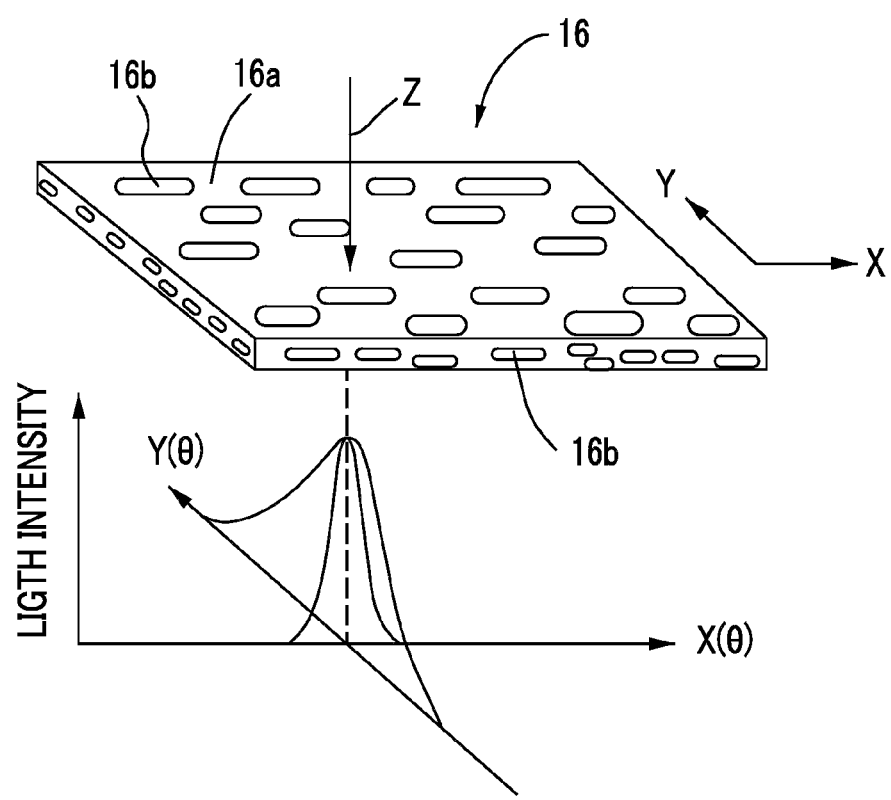
FIG. 8 is a pattern diagram showing an example of an anisotropic scattering layer that can be used in the invention and an example of a profile of scattered light distribution.

A cross-sectional pattern diagram of an example of the anisotropic scattering layer is shown in FIG. 8 together with an example of the scattered light profile. The anisotropic scattering layer 16 as shown in FIG. 8 is a layer including anisotropic particles 16b distributed in a continuous phase 16a composed of a matrix polymer. The anisotropic particles 16b are organic particles or inorganic particles having an anisotropic shape. The anisotropic scattering layer 16 exhibits scattering anisotropic properties based on the shape anisotropic properties of the anisotropic particles 16b, and has actions of scattering light that has transmitted the polarization film 10 and been incident from the Z direction and distributing the light more in the Y direction than in the X direction. When the Y direction is made to be coincident with the pattern cycle direction in the patterned phase difference film 12 and the absorption axes in the polarization film 10, the light is scattered from the Y direction. In the longitudinal direction of the stripe-shaped patterns in the patterned phase difference layer 12, the view angle in 3D display does not cause a problem, but there is a problem in that the view angle in 3D display is narrowed in the pattern cycle direction, but the view angle characteristics in the longitudinal direction of the patterns can be improved by disposing the anisotropic scattering layer 16 having the above actions without affecting the view angle characteristics in the longitudinal direction of the patterns.

In addition, the invention relates to a stereoscopic image display apparatus having at least the patterned polarization plate of the invention and a display panel. The patterned polarization plate is disposed on the observation side surface of the display panel, and divides incident light into polarized images (for example, circularly polarized images) for the right eye and the left eye. An observer observes the polarized images through a polarization plate, such as polarized glasses (for example, circularly polarized glasses) or the like, and recognizes stereoscopic images.

In the invention, there is no limitation on the display panel. The display panel may be, for example, a liquid crystal panel including a liquid crystal layer, an organic EL display panel including an organic EL layer, or a plasma display panel. In any aspect, a variety of available configurations can be employed. In addition, the liquid crystal panel and the like has a polarization film for image display on the surface of the observation side, but a polarization film having the patterned polarization plate of the invention may function as the above polarization film.

An example of the display panel is a liquid crystal panel which has a pair of polarization films and a liquid crystal cell between the polarization films. Generally, phase difference films for view angle compensation are disposed between the respective polarization films and the liquid crystal cell. The configuration of the liquid crystal cell is not particularly limited, and a liquid crystal cell having an ordinary configuration can be employed. The liquid crystal cell includes, for example, a pair of substrates disposed opposite, not shown, and a liquid crystal layer sandwiched between the pair of substrates, and may include a color filter layer and the like, if necessary. The driving mode of the liquid crystal cell is also not particularly limited, and a variety of modes, such as a twisted nematic (TN) mode, a super twisted nematic (STN) mode, a vertical alignment (VA) mode, an in-plane switching (IPS) mode, an optically compensated birefringence (OCB) mode, and blue phase, can be used.

The invention also relates to a stereoscopic image display system that has at least the image display apparatus of the invention and a polarization plate disposed on the observation side of the image display apparatus which can be removed, and enables observation of stereoscopic images through the polarization plate. An example of the polarization plate disposed outside of the stereoscopic image display apparatus on the observation side is polarized glasses that an observer wears. The observer observes right-eye and left-eye polarized images that the stereoscopic image display apparatus displays through circularly polarized or linearly polarized glasses, and recognizes stereoscopic images.

The image display system of the invention may be configured so that switching between 2D and 3D image display is possible. In the image display system that can switch 2D and 3D image display, the observer observes 3D images through a polarization plate, and observes 2D images in a state in which the polarization plate is removed. The details are described in JP3767962B, and can be referenced for the invention.

Hereinafter, a variety of members that are used in the patterned polarization plate of the invention and the like will be described in detail.

<Patterned Phase Difference Layer>

The patterned phase difference layer that can be used in the invention is a patterned phase difference layer in which at least one of the slow axes and the retardation are mutually different, and stripe-shaped first and second phase difference patterns are alternately disposed. A material for the patterned phase difference layer is not particularly limited, and a composition containing a liquid crystalline compound having a polymerizable group as a main component, a phase difference film, such as a stretched film, and the like can be used. A composition containing a liquid crystalline compound having a polymerizable group as a main component is preferred from the viewpoint of ease of patterning.

The phase difference layer can be formed by a variety of methods in which an oriented film is used, and the method is not particularly limited.

A first aspect is a method in which a plurality of actions that affect the orientation control of the discotic liquid crystal is used, and then some actions are lost due to external stimuli (a thermal treatment and the like), thereby making predetermined orientation control actions dominant. For example, the liquid crystal is made to have a predetermined orientation state using a combined action of an orientation control function of an oriented film and an orientation control function of an orientation controlling agent added to the liquid crystalline composition, the orientation state is fixed so as to form a phase difference area, then, one of the actions (for example, the action of the orientation controlling agent) is lost due to external stimuli (a thermal treatment and the like), the other orientation control action (the action of the oriented film) is made to be dominant so as to realize another orientation state, and the orientation state is fixed so as to form the other phase difference area. For example, since the pyridinium group or the imidazolium group in a predetermined pyridinium compound or a predetermined imidazolium compound is hydrophilic, the group is eccentrically present on the surface of the hydrophilic polyvinyl alcohol oriented film. Particularly, when the pyridinium group is further substituted with an amino group, which is a substituent of the acceptor of a hydrogen atom, an intermolecular hydrogen bond is generated between a polyvinyl alcohol, the onium salt is eccentrically present on the oriented film surface more densely, and the pyridinium derivative is oriented in an orthogonal direction to the main chain of the polyvinyl alcohol due to the effect of the hydrogen bond, and therefore the liquid crystals being orthogonally oriented with respect to a rubbing direction is promoted. Since the pyridinium derivative has a plurality of aromatic rings in the molecules, a strong intermolecular $\pi$-$\pi$ interaction is caused between the pyridinium derivative and the liquid crystal, particularly, the discotic liquid crystal, and an orthogonal orientation is induced in the vicinity of the oriented film surface of the discotic liquid crystal. Particularly, when a hydrophobic aromatic ring is bonded to a hydrophilic pyridinium group, the hydrophobic effect also results in an effect of inducing vertical orientation. However, when the optically anisotropic layer is heated to higher than a certain temperature, the hydrogen bond is broken, the density of the pyridinium compound and the like on the surface of the oriented film is lowered, and the actions are lost. As a result, the liquid crystal is oriented by the restraining force of the rubbing oriented film, and the liquid crystal is made to have a parallel orientation state. The above method is described in detail in JP2010-141345A, and the contents are cited from the specification thereof.

A second aspect is an aspect in which the pattern oriented film is used. In this aspect, pattern oriented films having mutually different orientation controlling functions are formed, a liquid crystal composition is disposed on the pattern oriented films, and the liquid crystal is oriented. The orientation of the liquid crystal is regulated by the respective orientation controlling functions of the pattern orientation films, and mutually different orientation states are achieved. When the respective orientation states are fixed, the patterns of the first and second phase difference areas are formed according to the patterns of the oriented films. The pattern oriented films can be formed by a printing method, mask-rubbing with respect to a rubbing oriented film, mask exposure with respect to a photo oriented film, or the like. In addition, it is also possible to form a pattern oriented film by uniformly forming an oriented film, and separately printing additives that affect the orientation controlling function (for example, the onium salt and the like) in a predetermined pattern. A method in which a printing method is used is preferred since a large facility is not required, and manufacturing is easy. The above method is described in detail in JP2010-173077A, and the contents are cited from the specification thereof.

In addition, the first and second aspects may be jointly used. An example is that a photo acid generating agent is added to the oriented film. In this example, the photo acid generating agent is added to the oriented film, the photo acid generating agent is decomposed by pattern exposure so as to form an area in which an acidic compound is generated and an area in which an acidic compound is not generated. In portions in which light is not irradiated, the photo acid generation agent is seldom decomposed, the interaction among the oriented film material, the liquid crystal, and an orientation controlling agent that is optionally added dominates the orientation state, and the liquid crystal is oriented in a direction in which the slow axis crosses orthogonally with the rubbing direction. When light is irradiated to the oriented film, and an acidic compound is generated, the interaction conversely loses the dominancy, the rubbing direction of the rubbing oriented film dominates the orientation state, and the liquid crystal is oriented in parallel in which the slow axis is in parallel with the rubbing direction. A water-soluble compound is preferably used as the photo acid generating agent that is used for the oriented film. Examples of available photo acid generating agents include the compounds as described in Prog. Polym. Sci., Vol 23, page 1485 (1998). A pyridinium salt, an iodonium salt, and a sulfonium salt are particularly preferably used as the photo acid generating agent. The above method is described in detail in JP2010-289360, and the contents are cited from the specification thereof.

Furthermore, as a third aspect, there is a method in which discotic liquid crystals having polymerizable groups for which the polymerization properties are mutually different (for example, an oxetanyl group and a polymerizable ethylenic unsaturated group) are used. In this aspect, the discotic liquid crystals are made to have a predetermined orientation state, and then light irradiation and the like are carried out under conditions in which a polymerization reaction of only one polymerizable group proceeds, thereby forming a pre-phase difference layer. Next, mask exposure is carried out under conditions in which the other polymerizable group can be polymerized (for example, in the presence of a polymerization initiator that initiates the polymerization of the other polymerizable group). The orientation state of the exposed portions is completely fixed, and one phase difference area having a predetermined Re is formed. In unexposed areas, a reaction of one reactive group proceeds, but the other reactive group remains unreacted. Therefore, when the liquid crystal is heated to a temperature exceeding an isotropic phase temperature at which a reaction of the other reactive group can proceed, the unexposed area is fixed in an isotropic phase state, that is, Re becomes 0 nm.

<Supporter Film>

A material for the supporter film is not particularly limited. A polymer film having low retardation is preferably used, and, specifically, a film having an absolute value of the retardation of approximately 10 nm or less is preferably used. Even in an aspect in which a protective film for the polarization film is disposed between the polarization film and the patterned phase difference film, a polymer film having low retardation is preferably used as the protective film, and the specific range is as described above.

Examples of a material forming a supporter film that can be used in the invention include polycarbonate-based polymers, polyester-based polymers, such as polyethylene terephthalate and polyethylene naphthalate, acryl-based polymers, such as polymethyl methacrylate, styrene-based polymers, such as polystyrene and acrylonitrile styrene copolymers (AS resin), and the like. In addition, the examples also include polyolefins, such as polyethylene and polypropylene, polyolefin-based polymers, such as ethylene propylene copolymers, vinyl chloride-based polymers, amide-based polymers, such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxy methylene-based polymers, epoxy-based polymers, and mixtures of polymers. In addition, the polymer film of the invention can be formed as a cured layer of an acryl-based, urethane-based, acryl urethane-based, epoxy-based, silicone-based, or other ultraviolet curable or thermosetting resin.

In addition, it is possible to preferably use a thermoplastic norbornene-based resin as a material for the film. The thermoplastic norbornene-based resin includes ZEONEX, and ZEONOR, manufactured by Zeon Corporation, ARTON, manufactured by JSR Corporation, and the like.

In addition, as a material for the film, cellulose-based polymers that have been used as a transparent protective film for a polarization plate of the related art, and are represented by triacetyl cellulose (hereinafter referred to as cellulose acylate) can be preferably used.

A method of manufacturing the supporter film is not particularly limited, and may be a melt film-forming method. In addition, a stretched film that has undergone a stretching treatment for adjustment of retardation may also be used.

<Adhesive Layer>

The adhesive layer is produced by joining and integrating the polarization film and the patterned phase difference film, is optically highly transparent, and preferably isotropic. Examples of an adhesive that can form an optically highly transparent and isotropic adhesive layer include a number of optical clear adhesive (OCA) materials, such as SANCUARY (manufactured by Sun A. Kaken Co., Ltd.), and SK Dyne (manufactured by Soken Chemical & Engineering Co., Ltd.). In addition, an agent that is generally classified as an adhesive may be used as long as the agent can be integrated.

<Surface Layer>

The patterned polarization plate of the invention may have a surface layer having a predetermined function. The surface layer includes a hard coating layer for protecting the surface layer from physical impacts from the outside, an anti-reflection layer for preventing reflected glare of external light, and the like. An example is an example of a laminate of a hard coating layer and an anti-reflection layer. The surface layer may have a forward scattering layer, a primer layer, an antistat layer, a basecoat layer, a protective layer, and the like together with or in exchange for the above layers. The details of the respective layers that compose the anti-reflection layer and the hard coating layer are described in [0182] to In JP2007-254699A, and preferred characteristics, preferred materials, and the like of the anti-reflection layer that can be used in the invention are also described in the same.

In addition, the invention also preferably has an anisotropic scattering layer as the surface layer. Particularly, an anisotropic scattering layer that can form the profile of scattering light distribution as shown in FIG. 8 is preferred. The details of the anisotropic scattering layer are described in JP42053878B and the like, which can be referenced.

<Polarization Film>

In the invention, an ordinary linearly polarization film can be used as the polarization film. The polarization film may be composed of a stretched film or may be a layer formed through coating. Examples of the former include films obtained by dyeing a stretched film of polyvinyl alcohol using iodine, a dichromatic pigment, or the like. Examples of the latter include a layer that is fixed in a predetermined orientation state by coating a composition including a dichromatic liquid crystalline colorant. Meanwhile, in the specification, the "polarization film" refers to a linearly polarization film.

<Liquid Crystalline Cell>

The liquid crystalline cell that is used in the stereoscopic image display apparatus of the invention is preferably a VA mode, an OCB mode, an IPS mode, or a TN mode, but is not limited thereto.

In the liquid crystalline cell in the TN mode, when no voltage is applied, the rod-shaped liquid crystalline molecules are oriented substantially horizontally, and, furthermore, twisted at 60° to 120°. The liquid crystalline cell in the TN mode is most widely used as a color TFT liquid crystal display apparatus, and described in many publications.

In the liquid crystalline cell in the VA mode, rod-shaped liquid crystalline molecules are oriented substantially vertically when no voltage is applied. The liquid crystalline cell in the VA mode includes (1) a liquid crystalline cell in the VA mode in a narrow definition in which rod-shaped liquid crystalline molecules are oriented substantially vertically when no voltage is applied, and substantially horizontally when voltage is applied (described in JP1990-176625A (JP-H2-176625A)), (2) a liquid crystalline cell (in the MVA mode) for which the VA mode is made to have multi domains for view angle enlargement (described in SID97, Digest of Tech. Papers (Proceedings) 28 (1997) 845), (3) a liquid crystalline cell in a mode in which rod-shaped liquid crystalline molecules are oriented substantially vertically when no voltage is applied, and twisted so as to be oriented into multi domains when voltage is applied (n-ASM mode) (described in the Proceedings of Japanese Liquid Crystal Society 58 to 59 (1998)), and (4) a liquid crystalline cell in a survival mode (presented in the LCD International 98). In addition, the liquid crystal may have any of a patterned vertical alignment (PVA) type, an optical alignment type, and polymer-sustained alignment (PSA). The details of the above modes are described in JP2006-215326A and JP2008-538819A.

In the liquid crystalline cell in the IPS mode, the rod-shaped liquid crystal molecules are disposed substantially in parallel to the substrate, and, when a parallel electric field is applied to the substrate surface, the liquid crystal molecules respond in a planar manner. The IPS mode displays black in an electric field-free state, and the transmission axes of a pair of top and bottom polarization plates cross orthogonally with each other. A method in which leaked light in an inclined direction while displaying black is reduced using an optical compensation sheet so as to improve the view angle is disclosed in JP2008-54982A (JP-H10-54982A), JP2009-202323A (JP-H11-202323A), JP2007-292522A (JP-H9-292522A), JP2009-133408A (JP-H11-133408A), JP2009-305217A (JP-H11-305217A), JP2008-307291A (JP-H10-307291A), and the like.

<Polarization Plate for the Stereoscopic Image Display System>

In the stereoscopic image display system of the invention, images are recognized through a polarization plate in order particularly to enable an observer to recognize stereoscopic images that are termed 3D images. An aspect of the polarization plate is polarized glasses. In an aspect in which right-eye and left-eye circularly polarized images are formed using a phase difference plate, circularly polarized glasses are used, and, in an aspect in which linearly polarized images are formed, linear glasses are used. The polarization plate is preferably configured so that right-eye image light rays emitted from one of the first and second phase difference areas of the phase difference layer are allowed to pass through the right-eye glass, but shielded at the left-eye glass, and left-eye image light rays emitted from the other of the first and second phase difference areas are allowed to pass through the left-eye glass, but shielded at the right-eye glass.

The polarized glasses include a phase difference function layer and a linearly polarizer so as to form polarized glasses. Meanwhile, other members having the same function as the linear polarizer may be used.

The specific configuration of the stereoscopic image display system of the invention including the polarization glasses will be described. Firstly, the phase difference plate is provided with the first phase difference areas and the second phase difference areas having different polarization conversion functions on a plurality of first lines and a plurality of second lines that are alternately repeated in the image display panel (for example, odd number lines and even number lines in the horizontal direction when the lines are in the horizontal direction, and odd number lines and even number lines in the vertical direction when the lines are in the vertical direction). In a case in which circularly polarized light is used for display, the phase difference at the first phase difference areas and the second phase difference areas is preferably $\lambda/4$, and it is more preferable that the slow axes of the first phase difference areas and the second phase difference areas cross orthogonally with each other.

In a case in which circularly polarized light is used, the phase difference values of the first phase difference areas and the second phase difference areas are all set to $\lambda/4$, right-eye images are displayed at odd number lines in the image display panel, when the slow axes of the odd number line phase difference areas are in a 45° direction, $\lambda/4$ plates are preferably disposed at both the right-eye glass and the left-eye glass of the polarization glasses, and the slow axis of the $\lambda/4$ plate of the right-eye glass of the polarization glasses simply needs to be fixed at specifically approximately 45°. In addition, in the above situation, similarly, left-eye images are displayed at even number lines in the image display panel, and the slow axis of the left-eye glass of the polarization glasses simply needs to be fixed at specifically approximately 135° when the slow axes of the even number line phase difference areas are in a 135° direction.

Furthermore, the angle of the slow axis fixed by the right-eye glass in an example of the above case is preferably close to accurately 45° in the horizontal direction from the standpoint that image light is once emitted as circularly polarized light at the patterning phase difference film, and the polarization state is returned to the original using the polarization glasses. In addition, the angle of the slow axis fixed by the left-eye glass is preferably close to accurately horizontal 135° (or −45°).

In addition, for example, in a case in which the image display panel is a liquid crystal display panel, it is preferable that the direction of the absorption axis of the front-side polarization plate of the liquid crystal display panel be ordinarily in the horizontal direction, and the absorption axis of the linear polarizer of the polarized glasses be in a direction orthogonal to the direction of the absorption axis of the front-side polarization plate, and the absorption axis of the linear polarizer of the polarization glasses is more preferably in a vertical direction.

In addition, the direction of the absorption axis of the front-side polarization plate of the liquid crystal display panel and the respective slow axes of the odd number line phase difference areas and the even number line phase difference areas in the patterning phase difference film are preferably at 45° in terms of the polarization conversion efficiency. Meanwhile, a preferred disposition of such polarization glasses, the patterning phase difference film, and the liquid crystal display apparatus is disclosed in, for example, JP2004-170693A.

Examples of the polarization glasses include the polarization glasses as described in JP2004-170693A and accessories of ZM-M220W, manufactured by Zalman Tech Co., which is a commercially available product.

EXAMPLES

Hereinafter, the invention will be described more specifically based on examples. Materials, amounts used, proportions, treatment contents, treatment sequences, and the like as shown in the following examples can be appropriately modified within the scope of the purport of the invention. Therefore, the scope of the invention is not interpreted to be limited to specific examples as shown below.

Example 1

A patterned phase difference film having the same configuration as in FIG. 2 was manufactured, and joined to a polarization film in the same axis relationship as in FIG. 1, thereby manufacturing a patterned polarization plate (1). The patterned phase difference layer was formed of a polymerizable liquid crystalline composition using a mask rubbing-oriented film and the like. The formed patterned phase difference layer was a patterned phase difference layer in which stripe-shaped λ/4 layers having slow axes that crossed orthogonally to each other in a 45° direction and a −45° direction respectively were alternately disposed. As the supporter film, an 80 μm-thick TAC film, manufactured by Fuji Film Holdings Corporation, was used. The patterned phase difference film was joined to the polarization film. The patterned phase difference film was joined to the polarization film in a state in which the pattern cycle direction in the patterned λ/4 layer was in parallel with the absorption axes in the polarization film.

Figure 3:
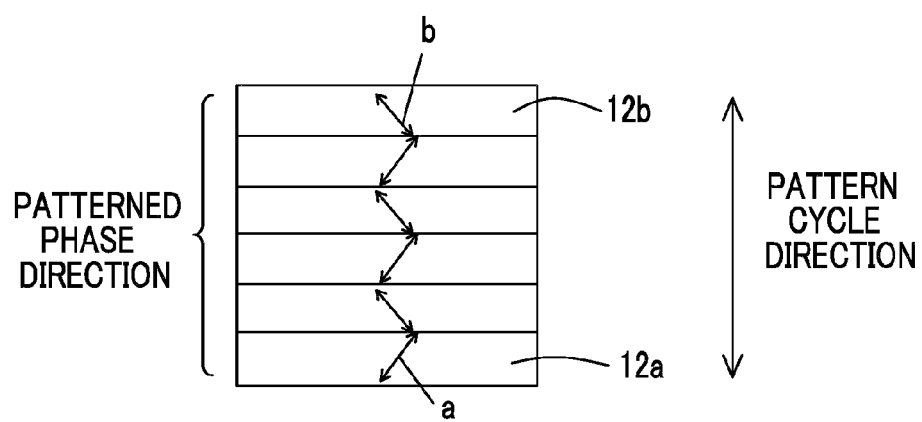
FIG. 3 is a top pattern diagram of an example of the patterned phase difference layer that can be used in the invention.
Figure 10:
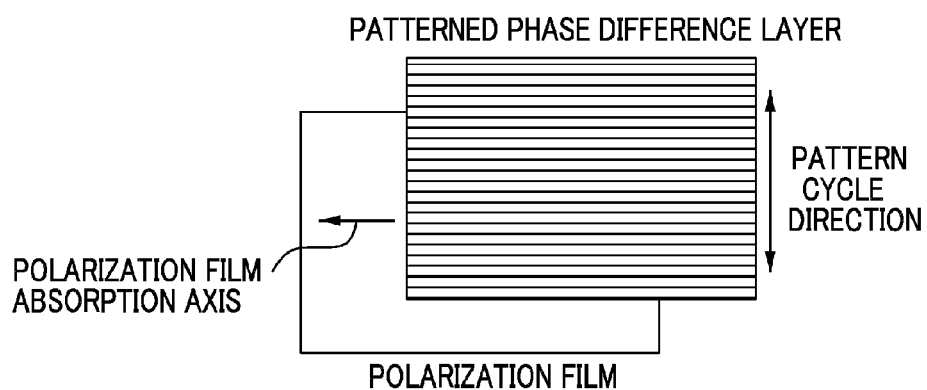
FIG. 10 is a pattern diagram used to explain a patterned polarization plate (2) that was manufactured in a comparative example.

A patterned polarization plate (2) for a comparative example was manufactured in the same manner as for the patterned polarization plate (1) except that the patterned λ/4 layer as shown in FIG. 3 was joined to the polarization film in a state in which the pattern cycle direction was made to be orthogonal to the absorption axes in the polarization film. That is, the patterned phase difference layer was joined to the polarization film in the relationship as shown in FIG. 10 so as to manufacture the patterned polarization plate (2) for a comparative example. In this patterned polarization plate, the absorption axes in the polarization film and the pattern cycle direction in the patterned phase difference layer were orthogonal.

Figure 11A:
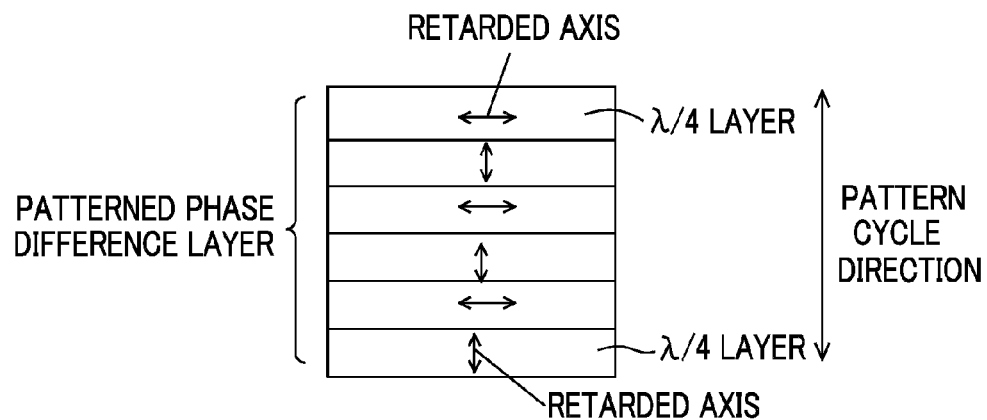
FIGS. 11A and 11B are pattern diagrams used to explain a patterned polarization plate (3) that was manufactured in a comparative example.
Figure 11B:
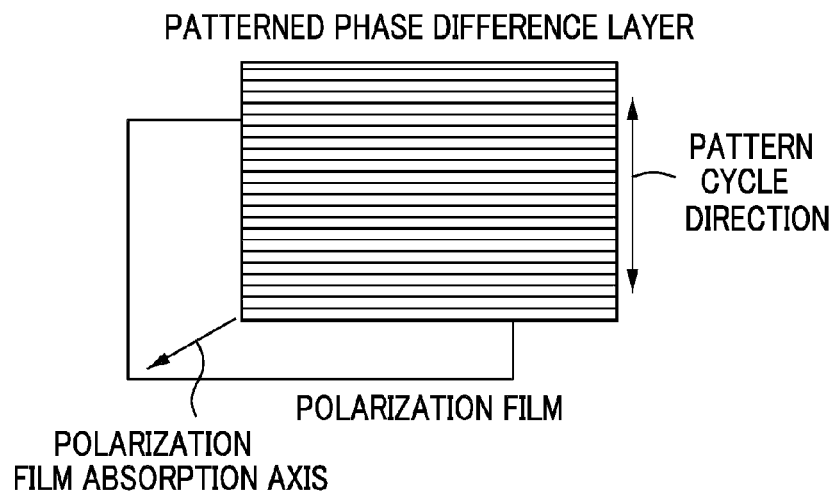

A patterned phase difference film having the same configuration as in FIG. 2 was manufactured. However, the slow axes in the patterned λ/4 layer were set to 0° and 90° as shown in FIG. 11A. The patterned phase difference film was joined to the polarization film in the relationship as shown in FIG. 11B so as to manufacture a patterned polarization plate (3) for a comparative example. In this patterned polarization plate, the absorption axes in the polarization film and the pattern cycle direction in the patterned phase difference layer crossed each other at 45°.

A glass substrate (0.7 mm-thick, 200 mm×300 mm) was joined using two sheets of sealing material (3025G, an ODF ultraviolet curable sealing material manufactured by Threebond Co., Ltd.), chosen as a display panel, and the respective pattern polarization plates as manufactured above were disposed on one surface of the display panel, thereby manufacturing simulation panels respectively. Position marks that would act as dimensional standards were formed on the respective glass substrates in advance through photolithography using Al. Specifically, the absorption axes in the polarization film and the pattern cycle direction in the patterned phase difference layer were disposed in the up and down directions in the patterned polarization plate (1); the absorption axes in the polarization film were disposed in the right and left direction similarly to the polarization film on the observation side, such as liquid crystal panels in the VA mode, the IPS mode, and the like of the related art, and the pattern cycle direction in the patterned phase difference layer was disposed in the up and down directions in the patterned polarization plate (2); and the absorption axes in the polarization film were disposed in the 45° direction similarly to the polarization film on the observation side, such as liquid crystal panels in the TN mode, and the like of the related art, and the pattern cycle direction in the patterned phase difference layer was disposed in the up and down directions in the patterned polarization plate (3). The sizes of the respective joined patterned polarization plates were 150 mm (pattern cycle direction)×250 mm (longitudinal direction of the stripe-shaped pattern).

Temperature and humidity tests were carried out on the respective manufactured simulation panels. The temperature and humidity conditions were 60° C.×90%×24 hours, and then position deviation (150 mm direction, up and down directions, and short side direction) from pixel electrodes (position mark of Al) was investigated and compared through microscopic observation. The results are shown in the following table.

TABLE 1

| Patterned polarization plate | Maximum value of position deviation (before test) | Maximum value of position deviation (after test) | Remark |
|---|---|---|---|
| Patterned polarization plate (1) | 5 μm | 10 μm | Example |
| Patterned polarization plate (2) | 5 μm | 25 μm | Comparative example |

TABLE 1-continued

| Patterned polarization plate | Maximum value of position deviation (before test) | Maximum value of position deviation (after test) | Remark |
|---|---|---|---|
| Patterned polarization plate (3) | 5 μm | 25 μm | Comparative example |

As shown in the above table, it was found that the dimensional change in the up and down directions after environment tests can be suppressed to a low level by making the absorption axes in the polarization film and the cycle direction of the patterned phase difference layer be coincident, and making the absorption axes in the polarization film in the up and down directions. As shown in FIG. 9B, it can be understood that, since dimensional change in the up and down directions becomes a cause of crosstalk, the examples of the invention, in which the dimensional change in the up and down directions can be suppressed, are appropriate for 3D display for which a patterning phase difference film for which alignment precision is important is used.

Example 2

The rear and front side polarization plates of a liquid crystal display panel in a commercially available polarized glasses-type 22-inch wide 3D monitor (manufactured by Hyundai Monitors, TN liquid crystal used, W220S) were separated, and straight (linearly) polarization films were disposed so that the absorption axes were in parallel with the right and left direction of the display surface on the rear side, and the absorption axes were in parallel with the up and down directions of the display surface on the front side respectively. Then, a patterned phase difference film having the configuration as shown in FIG. 2 and the patterned λ/4 layer as shown in FIG. 3 was laminated on the front side polarization film in the relationship as shown in FIG. 1. That is, an image display apparatus (1) having the patterned polarization plate (1) was manufactured. The widths of the respective patterns in the λ/4 layer in the cycle direction were 282 μm.

With an original resolution of 1680×1050, still image data-based 2D images were three-dimensionally displayed using 3D conversion software (TriDef 3D Experience) included. In the image display apparatus, right-eye images and left-eye images were converted to linearly polarization though the linearly polarization film, and the straight polarization of the right-eye images was converted to right circular polarization, and the straight polarization of the left-eye images was converted to left circular polarization respectively through the patterned phase difference film. In addition, polarized glasses included in the commercially available 3D monitor was composed of a right-eye glass that always allows passage of right circularly polarized light and shuts left circularly polarized light, and a left-eye glass that always allows passage of left circularly polarized light and shuts out right circularly polarized light.

Crosstalk during 3D image display was computed by performing 100× (display 2/display 0) with respect to the right eye, and performing 100× (display 1/display 0) with respect to the left eye. Here, the display 0 indicates brightness in a case in which both odd number and even number lines display white, the display 1 indicates brightness in a case in which odd number lines display white, and even number lines display black, and the display 2 indicates brightness in a case in which odd number lines display black, and even number lines display white (reference: paragraph [0096] in the specification of JP2010-018384A).

As comparative examples, a pair of polarization films were prepared in which the absorption axes in the polarization film were at 45° and at 135° in accordance with the polarization plates on the rear side and the front side in a TN liquid crystal mode that had been manufactured by Hyundai Monitors. The polarization films were joined to a liquid crystal panel, and then a patterning phase difference film having a patterning λ/4 layer having the same configuration as shown in FIG. 11A was joined, thereby manufacturing a liquid crystal display apparatus for a comparative example. That is, an image display apparatus (3) having the patterned polarization plate (3) for a comparative example was manufactured. 3D stereoscopic display was also carried out in the image display apparatus in the same manner as above, and occurrence rate of crosstalk was computed in the same manner as above.

The results are shown in the following table. Meanwhile, the results of the above Table 1 are also shown together.

TABLE 2

| Image display apparatus | Patterned polarization plate | Maximum value of position deviation (before test) | Maximum value of position deviation (after test) | Crosstalk (after test) | Remark |
|---|---|---|---|---|---|
| (1) | (1) | 5 μm | 10 μm | Approximately 5% | Example |
| (3) | (3) | 5 μm | 25 μm | Approximately 10% | Comparative example |

It is confirmed from the results shown in the above table that the effects of the invention became evident even in an actual module.

Example 3

A patterned phase difference film having a surface layer that has the configuration as shown in FIG. 6 was manufactured. The patterned phase difference layer was a patterned λ/4 layer having the configuration as shown in FIG. 3, and formed in the same manner as in Example 1. In addition, the same film as in Example 1 was used as the supporter film. Here, the anisotropic scattering layer is not particularly limited within the scope of the purport of the invention; however, for example, the anisotropic scattering layer as described in JP4205388B can be preferably used, and the anisotropic scattering layer can be used after appropriate optimization. That is, similarly to the description in the patent publication of the above reference, a kneaded substance of 95% of a cyclic polyolefin resin (manufactured by Zeon Corporation, 1060R) and 5% of GPPS (a general polystyrene-based resin, manufactured by Daicel Corporation, GPPS #30) as a dispersion resin was formed into an anisotropic scattering function film by melt film-forming in which a T die was used. The anisotropic scattering function film and the patterned phase difference film were joined and integrated, and the resultant was joined to the polarization film, thereby manufacturing a patterned polarization plate (4) having the configuration as shown in FIG. 7. The polarization film and the patterned phase difference layer were joined in a state in which the absorption axes in the polarization film and the pattern cycle direction in the patterned phase difference layer were in parallel as shown in FIG. 1.

Meanwhile, the anisotropic scattering layer is a layer that exhibits anisotropic scattering properties as shown in FIG. 8 with respect to light incident on the polarization film from the normal direction and emitted from the anisotropic scattering layer, and, specifically, anisotropic scattering properties with which light is more distributed are exhibited in the absorption axis direction (the Y direction in the drawing) of the polarization film compared to the orthogonal direction (the X direction in the drawing).

In Example 2, an image display apparatus (4) was manufactured in the same manner except that the patterned polarization plate (4) was disposed instead of the patterned polarization plate (1) in the manufacturing of the image display apparatus (1).

As a result of displaying 3D images on the image display apparatus (4) in the same manner as in Example 2, and observing the 3D images in a variety of directions, it was confirmed that the view angle characteristics in the up and down directions of the screen were improved compared with the image display apparatus (1), and the view angle characteristics in the right and left direction of the screen were as preferable as in the image display apparatus (1). From the above fact, it can be understood that the view angle characteristics in the up and down directions of the screen can be improved without degrading the characteristics in the right and left direction of the screen by disposing an anisotropic scattering layer having a strong scattering performance in the up and down directions of the screen as the surface layer.

Meanwhile, in Examples 1 to 3, the surface of the polarization film and the patterned phase difference layer were joined using an adhesive as shown in FIG. 4, but the same effects can be obtained even when the supporter film is joined to the surface of the polarization film as shown in FIG. 5. Furthermore, the same effects can be obtained even when a separate film is disposed as the protective film for the polarization film between the patterned phase difference layer and the polarization film in the configuration of FIG. 4.

What is claimed is:

1. A patterned polarization plate disposed on an observation-side surface of a display panel, comprising at least:
a patterned phase difference layer in which at least one of slow axes and retardation are mutually different and stripe-shaped first and second phase difference patterns are mutually disposed;
a patterned phase difference film having a film that supports the patterned phase difference layer;
a polarization film; and
a surface layer on a surface of the patterned phase difference film and on the opposite side to the surface on which the patterned phase difference layer is disposed,
wherein a pattern cycle direction in the patterned phase difference layer and absorption axes in the polarization film are in parallel with each other, and
wherein the surface layer exhibits an anisotropic scattering function with respect to light incident from a polarization film side and light emitted from the surface layer has an anisotropic scattering function that exhibits stronger scattering characteristics in the pattern cycle direction in the patterned phase difference layer than in an orthogonal direction to the pattern cycle direction.

2. The patterned polarization plate according to claim 1, wherein the patterned phase difference layer is a patterned $\lambda/4$ layer in which first and second patterns in which the retardation is $\lambda/4$ at a wavelength $\lambda$ nm in a visible light range, and the slow axes are respectively in ±45° directions with respect to the orthogonal direction of the pattern cycle direction are mutually disposed.

3. An image display apparatus comprising at least:
a display panel; and
the patterned polarization plate according to claim 1 on an observation-side of the display panel,
wherein the polarization film in the patterned polarization plate has absorption axes in the polarization film disposed in parallel with the up and down directions of a display surface of the display panel.

4. The image display apparatus according to claim 3, wherein the display panel is a liquid crystal panel.

5. An image display system comprising:
the image display apparatus according to claim 3; and
a polarization plate disposed between the image display apparatus and an observer which can be removed,
wherein 3D images are observed by the observer through the polarization plate.

6. An image display system comprising:
the image display apparatus according to claim 4; and
a polarization plate disposed between the image display apparatus and an observer which can be removed,
wherein 3D images are observed by the observer through the polarization plate.

7. The image display system according to claim 5, wherein 2D images are observed by the observer in a state in which the polarization plate is removed.

* * * * *